(12) United States Patent
Chiu et al.

(10) Patent No.: US 6,595,111 B1
(45) Date of Patent: Jul. 22, 2003

(54) ELECTRIC TOASTER

(75) Inventors: Chin-Cheng Chiu, Chang-Hua Hsien (TW); Po-Wen Hsiao, Chin-Men Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 10/321,995

(22) Filed: Dec. 17, 2002

(51) Int. Cl.$^7$ .............................. A47J 37/08; H05B 1/02
(52) U.S. Cl. ................... 99/327; 99/329 P; 99/329 RT; 99/331; 99/385; 99/389; 99/391; 219/386; 219/392; 219/413; 219/514; 219/521
(58) Field of Search ........................... 99/326–333, 337, 99/338, 385–393; 219/392, 412–414, 514, 518, 521, 385, 386, 494, 497, 491, 493, 509

(56) References Cited

U.S. PATENT DOCUMENTS

| | | | |
|---|---|---|---|
| 3,869,970 A | * | 3/1975 | Eagle ...................... 99/329 R |
| 3,956,978 A | * | 5/1976 | Borley ..................... 99/329 R |
| 4,986,173 A | * | 1/1991 | Hahnewald et al. ...... 99/331 X |
| 5,018,437 A | * | 5/1991 | San Juan ..................... 99/327 |
| 5,044,263 A | * | 9/1991 | Birkert et al. ................ 99/327 |
| 5,085,136 A | * | 2/1992 | Eisenberg ..................... 99/391 |
| 5,097,751 A | * | 3/1992 | Eisenberg et al. ............. 99/327 |
| 5,304,782 A | * | 4/1994 | McNair et al. ............. 219/518 |
| 5,647,270 A | * | 7/1997 | Rousseau et al. ............. 99/327 |
| 5,918,532 A | * | 7/1999 | Arnedo et al. ................ 99/327 |
| 5,947,006 A | * | 9/1999 | Mauffrey .................. 99/389 X |
| 6,123,012 A | * | 9/2000 | Hardin et al. ................. 99/326 |
| 6,230,611 B1 | * | 5/2001 | Mauffrey ..................... 99/327 |

\* cited by examiner

*Primary Examiner*—Timothy F. Simone
(74) *Attorney, Agent, or Firm*—Ladas & Parry

(57) ABSTRACT

In an electric toaster, a power switch unit is switched by a actuator provided on a support seat, which is movable together with a carriage, from an OFF-mode, where power to an electric heating unit is cut-off, to an ON-mode, where power is supplied to the heating unit, when the carriage is moved from an upper limit position to a lower limit position. A control unit energizes an electromagnet when the switch unit is switched to the ON-mode to attract a magnetically-attracted plate on the seat so that, once a force to move the carriage to the lower limit position is relieved, a biasing device biases the carriage to move from the lower limit position to a toasting position, thereby holding the seat in a lower retaining position against biasing action of a biasing member and thereby holding the carriage in the toasting position.

8 Claims, 7 Drawing Sheets

ELECTRIC TOASTER

BACKGROUND OF THE INVENTION

1. Field of the Invention

The invention relates to an electric toaster, more particularly to an electric toaster that can enhance safety.

2. Description of the Related Art

A conventional electric toaster includes a housing having a toasting compartment, and a carriage. The toasting compartment is provided with slots at its top for receiving bread to be toasted. An electric heating unit is disposed in the toasting compartment. The carriage is operable so as to move between an upper position and a lower position. When the carriage is disposed in the upper position, the electric heating unit is deactivated. When the carriage is moved to the lower position, the electric heating unit is activated so as to toast the bread loaded in the carriage. In a normal state, the carriage can be moved automatically from the lower position to the upper position in a known manner after a predetermined toasting cycle. Generally, an excited electromagnet is used to attract the carriage during the toasting cycle. It is noted that an over-heating problem cannot be prevented when the carriage is jammed at the lower position for some reason. In order to overcome the aforesaid problem, a relay can be used to control the supply of electric power to the electric heating unit. Such a solution, however, results in a relatively high cost.

SUMMARY OF THE INVENTION

Therefore, the object of the present invention is to provide an electric toaster that can effectively control deactivation of an electric heating unit even when jamming of a carriage occurs.

According to the present invention, an electric toaster comprises:

a housing including a toasting compartment;

an electric heating unit disposed in the toasting compartment;

a carriage mounted in the toasting compartment and movable vertically among a lower limit position, an upper limit position, and a toasting position between the lower limit and upper limit positions and located closer to the lower limit position as compared to the upper limit position, whereby a food item to be toasted is adapted to be loaded in and unloaded from the carriage when the carriage is in the upper limit position, and whereby the food item is adapted to be toasted when the carriage is in the toasting position;

a biasing device disposed in the housing for biasing the carriage to the upper limit position;

a magnetically-attracted retaining mechanism including a support seat movably supported by the carriage so as to be movable together with the carriage among the upper limit position, the lower limit position and the toasting position, the support seat being further movable relative to the carriage between an upper releasing position and a lower retaining position, a biasing member provided on the support seat for biasing the support seat to the upper releasing position, a magnetically-attracted plate mounted on the support seat, and a switch actuator provided on the support seat;

a control unit connected electrically to the electric heating unit, the control unit including a power switch unit disposed in the housing and switched by the switch actuator from an OFF-mode, where electric power to the electric heating unit is cut-off, to an ON-mode, where electric power is supplied to the electric heating unit, when the carriage is moved from the upper limit position to the lower limit position upon application of an external force against biasing action of the biasing device; and an electromagnet disposed in the housing adjacent to the carriage and connected electrically to the control unit, the electromagnet being energized by the control unit when the power switch unit is switched from the OFF-mode to the ON-mode to attract the magnetically-attracted plate so that, once the external force applied for moving the carriage to the lower limit position is relieved, the biasing device biases the carriage to move from the lower limit position to the toasting position, thereby holding the support seat in the lower retaining position against biasing action of the biasing member and thereby holding the carriage in the toasting position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
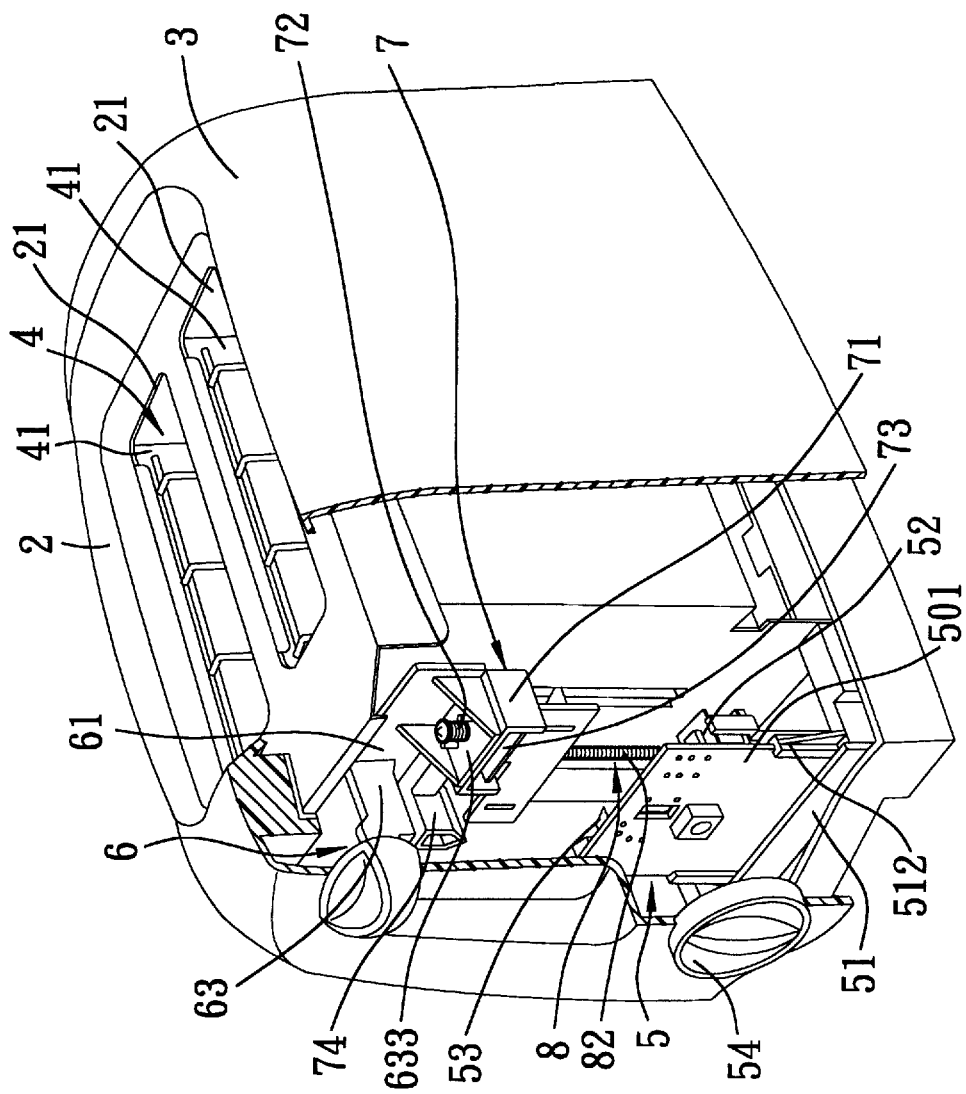
FIG. 1 is a perspective, partly cutaway view showing the preferred embodiment of an electric toaster according to the present invention.
Figure 2:
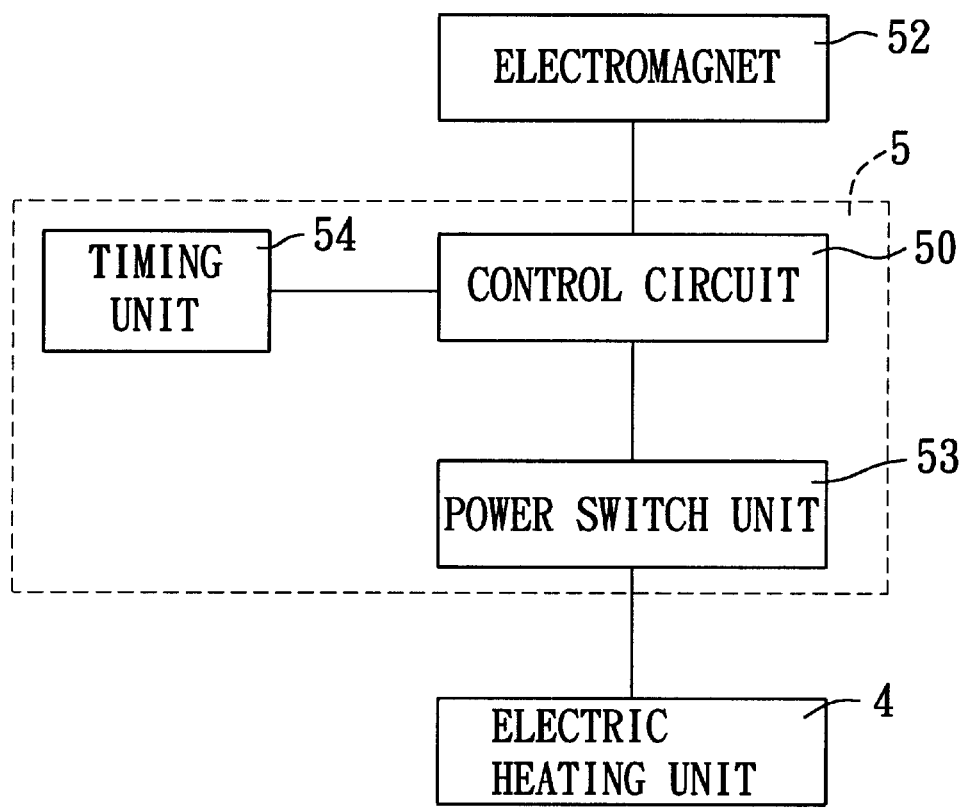
FIG. 2 is a schematic circuit block diagram illustrating the preferred embodiment.

Referring to FIGS. 1 to 4, the preferred embodiment of an electric toaster according to the present invention is shown to include a housing 3, an electric heating unit 4, a carriage 6, a biasing device 8, a magnetically-attracted retaining mechanism 7, a control unit 5, and an electromagnet 52.

The housing 3, which is made of a heat-resistant plastic material, includes a toasting compartment 2 that is provided with two slots 21 at its top for receiving a food item (not shown) for toasting.

The electric heating unit 4 is disposed in the toasting compartment 2 for supplying heat energy required for toasting the food item. In this embodiment, the electric heating unit 4 includes a plurality of electric heating plates 41.

Figure 6:
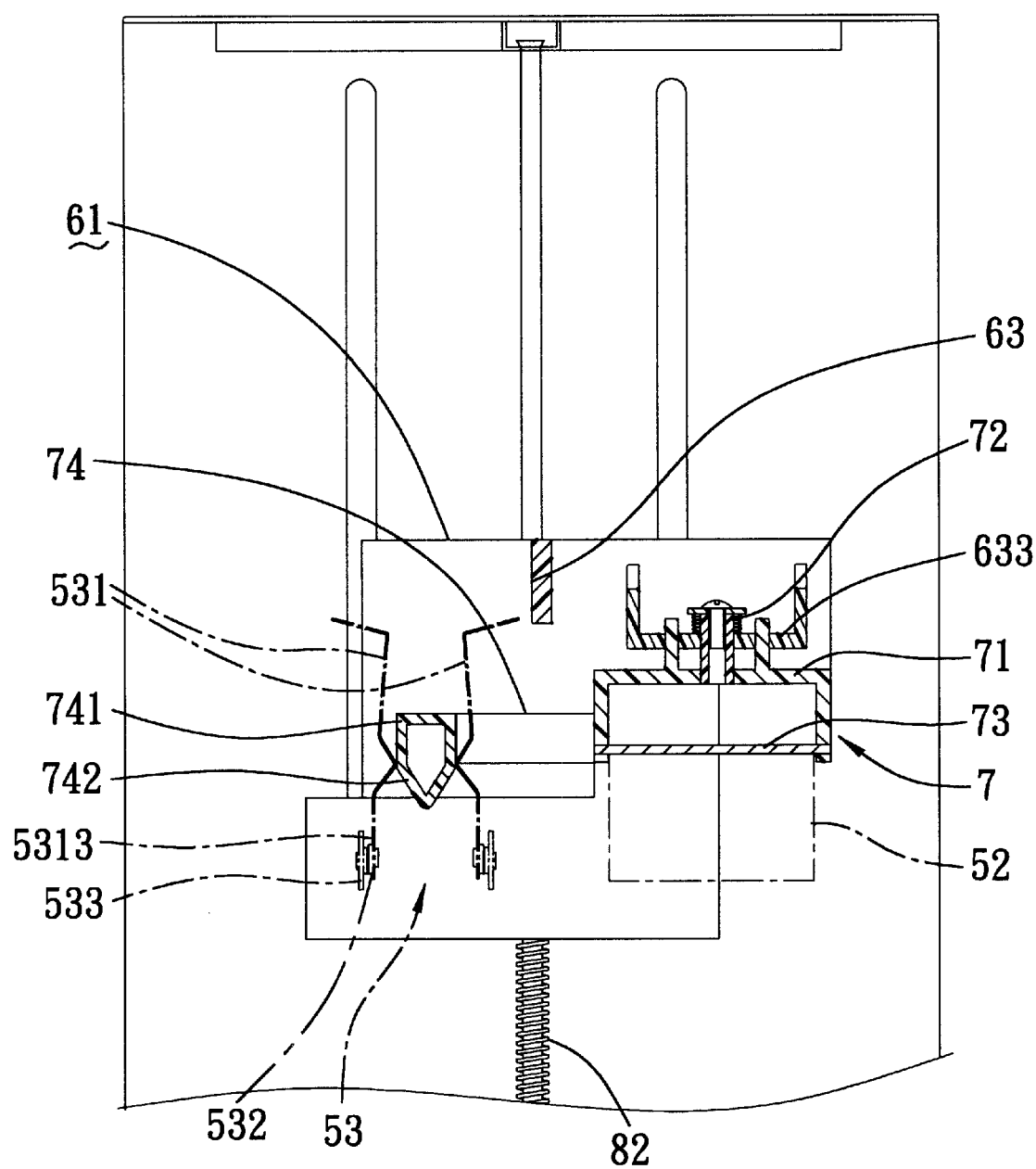
FIG. 6 is a fragmentary partly sectional schematic view showing the preferred embodiment when the carriage is disposed in a toasting position and when the power switch unit is switched to the ON-mode.

The carriage 6 is mounted in the toasting compartment 2, and is movable vertically among a lower limit position, an upper limit position, and a toasting position between the lower limit and upper limit positions and located much closer to the lower limit position as compared to the upper limit position, whereby the food item to be toasted is adapted to be loaded in and unloaded from the carriage 6 when the carriage 6 is in the upper limit position (see FIG. 4), and whereby the food item is adapted to be toasted when the carriage 6 is in the toasting position (see FIG. 6). In this embodiment, the carriage 6 has a supporting portion (not shown) extending horizontally into the toasting compartment 2, an operating portion 63 extending outwardly of the housing 3, and an interconnecting portion 61 interconnecting the supporting portion and the operating portion 63. The carriage 6 is further formed with a mounting plate 633 that is fixed on the interconnecting portion 61.

The biasing device 8 is disposed in the housing 3 for biasing the carriage 6 to the upper-limit position. In this embodiment, the biasing device 8 includes a guiding post 81 extending through the supporting portion, and a biasing spring 82 sleeved on-the guiding post 81 and disposed between the supporting portion and a base 51 that is fixed in the toasting compartment 2.

Figure 4:
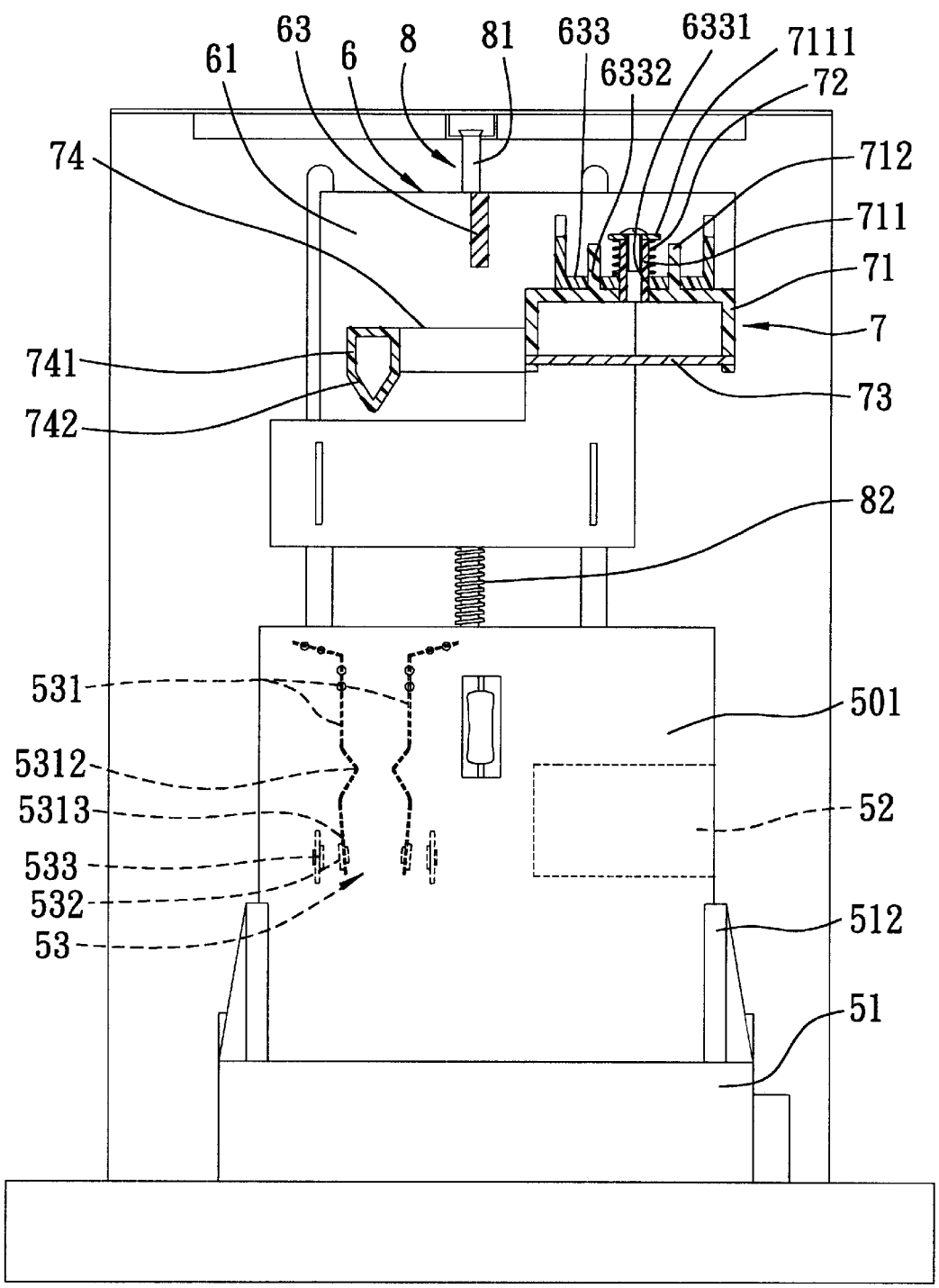
FIG. 4 is a partly sectional schematic view showing the preferred embodiment when a carriage is disposed in an upper limit position.

The magnetically-attracted retaining mechanism 7 includes a support seat 71, a biasing member, a magnetically-attracted plate 73, and a switch actuator 74. The support seat 71 is movably supported by the carriage 6 so as to be movable together with the carriage 6 among the upper limit position, the lower limit position and the toasting position. The support seat 71 is further movable relative to the carriage 6 between an upper releasing position and a lower retaining position. In this embodiment, as best shown in FIG. 4, the mounting plate 633 is formed with a post hole 6331 therethrough. The support seat 71 is formed with a sleeve post 711 that extends slidably through the post hole 6331. The sleeve post 711 has a distal top end with a stop ring 7111 mounted thereon. The biasing member is provided on the support seat 71 for biasing the support seat 71 to the upper releasing position. In this embodiment, the biasing member includes a coil spring 72 sleeved on the sleeve post 711 and having opposite ends that abut against the stop ring 7111 and the mounting plate 633, respectively, as best shown in FIG. 4. The mounting plate 633 is further formed with a pair of guide holes 6332 therethrough. The support seat 71 further has a pair of guide posts 712 that extend slidably through the guide holes 6332 in the mounting plate 633, respectively, as best shown in FIG. 4. The magnetically-attracted plate 73 is mounted on a bottom side of the support seat 71. The switch actuator 74 is provided on the support seat 71. In this embodiment, as best shown in FIG. 4, the switch actuator 74 includes a wider spreader portion 741, and a narrower guide portion 742 which extends downwardly from the spreader portion 741 and which has a width smaller that that of the spreader portion 741.

Figure 3:
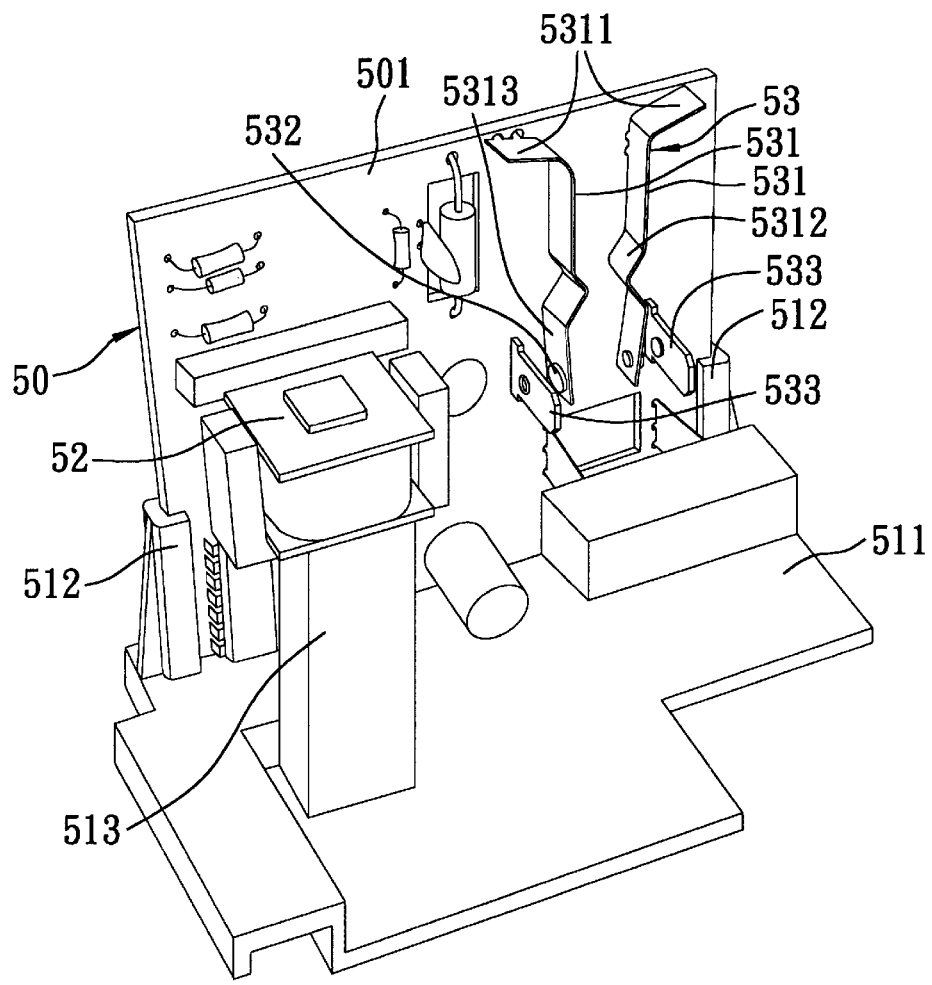
FIG. 3 is a perspective view showing a control circuit, an electromagnet and a power switch unit of the preferred embodiment.
Figure 5:
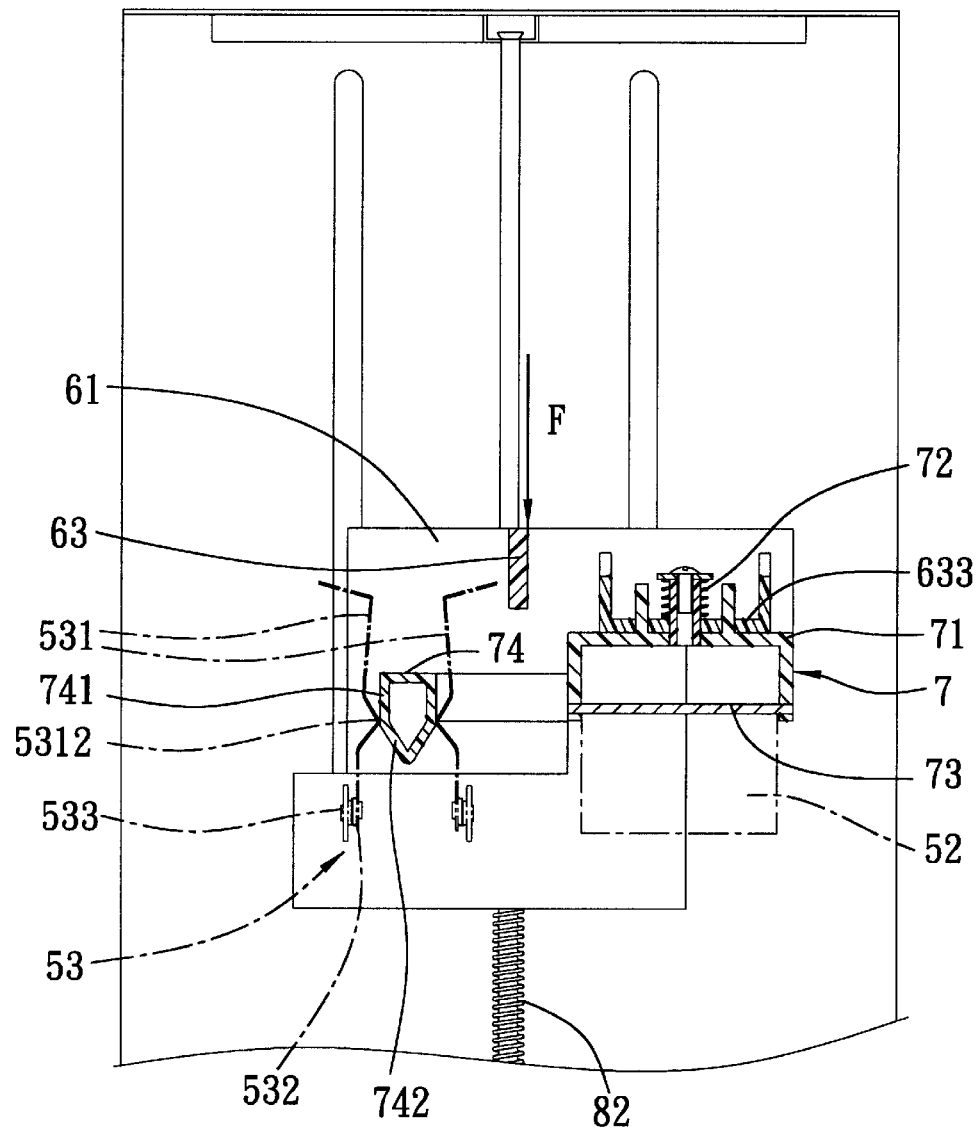
FIG. 5 is a fragmentary partly sectional schematic view showing the preferred embodiment when the carriage is disposed in a lower limit position and when the power switch unit is switched to an ON-mode.

The control unit 5 is connected electrically to the electric heating unit 4. The control unit 5 includes a control circuit 50 and a power switch unit 53. The control circuit 50 includes a plurality of electronic components mounted on a circuit board 501 that is in turn mounted in opposite slots 512 provided on the base 51, as shown in FIG. 3.. The power switch unit 53 is disposed in the housing 3 and is connected electrically to the control circuit 50. The power switch unit 53 is switched by the switch actuator 74 from an OFF-mode, where electric power to the electric heating unit 4 is cut-off, to an ON-mode, where electric power is supplied to the electric heating unit 4, when the carriage 6 is moved from the upper limit position to the lower limit position upon application of an external force (F) against biasing action of the biasing device 8 (see FIG. 5). The power switch unit 53 includes a stationary contact member mounted fixedly on the circuit board 501, and a resilient contact member mounted on the circuit board 501. The resilient contact member has a resilient contact part normally spaced apart from the stationary contact member to dispose the power switch unit 53 in the OFF-mode, and urged by the switch actuator 74 so as to contact electrically the stationary contact member to switch the power switch unit 53 to the ON-mode. In this embodiment, as best shown in FIG. 3, the stationary contact member includes a pair of first contacts 533 spaced apart from each other. The resilient contact member includes a pair of resilient plates 531 disposed between the first contacts 533. Each of the resilient plates 531 has an anchoring end portion 5311 secured to the circuit board 501, a distal end portion 5313 provided with a second contact 532 for contacting an adjacent one of the first contacts 533, and a curved intermediate portion 5312 between the anchoring and distal end portions 5311, 5313 and curving toward the other of the resilient plates 531. The curved intermediate and distal end portions 5312, 5313 of the resilient plates 531 serve as the resilient contact part of the resilient contact member. The spreader portion 741 of the switch actuator 74 abuts against the curved intermediate portions 5312 of the resilient plates 531 to cause the resilient plates 531 to move away from each other and cause the second contacts 532 to contact the first contacts 531 when the carriage 6 is moved to the lower limit position (see FIG. 5), and when the carriage 6 is in the toasting position and the support seat 71 is held in the lower retaining position by the electromagnet 52 (see FIG. 6). The guide portion 742 of the switch actuator 74 abuts against the curved intermediate portions 5312 of the resilient plates 531 to enable the resilient plates 531 to moved toward each other and cause the second contacts 533 to break contact with the first contacts 532 when the support seat 71 moves from the lower retaining position to the upper releasing position while the carriage 6 is in the toasting position (see FIG. 7).

The electromagnet 52 is disposed in the housing 3 and is mounted on a support frame 513 provided on the base 51 adjacent to the carriage 6. The electromagnet 52 is connected electrically to the control circuit 50 of the control unit 5, and is energized by the control unit 5 when the power switch unit 53 is switched from the OFF-mode to the ON-mode to attract the magnetically-attracted plate 73 so that, once the external force (F) applied for moving the carriage 6 to the lower limit position is relieved, the biasing spring 82 of the biasing device 8 biases the carriage 6 to move from the lower limit position to the toasting position, thereby holding the support seat 71 in the lower retaining position against biasing action of the biasing member 72 and thereby holding the carriage 6 in the toasting position (see FIG. 6).

Figure 7:
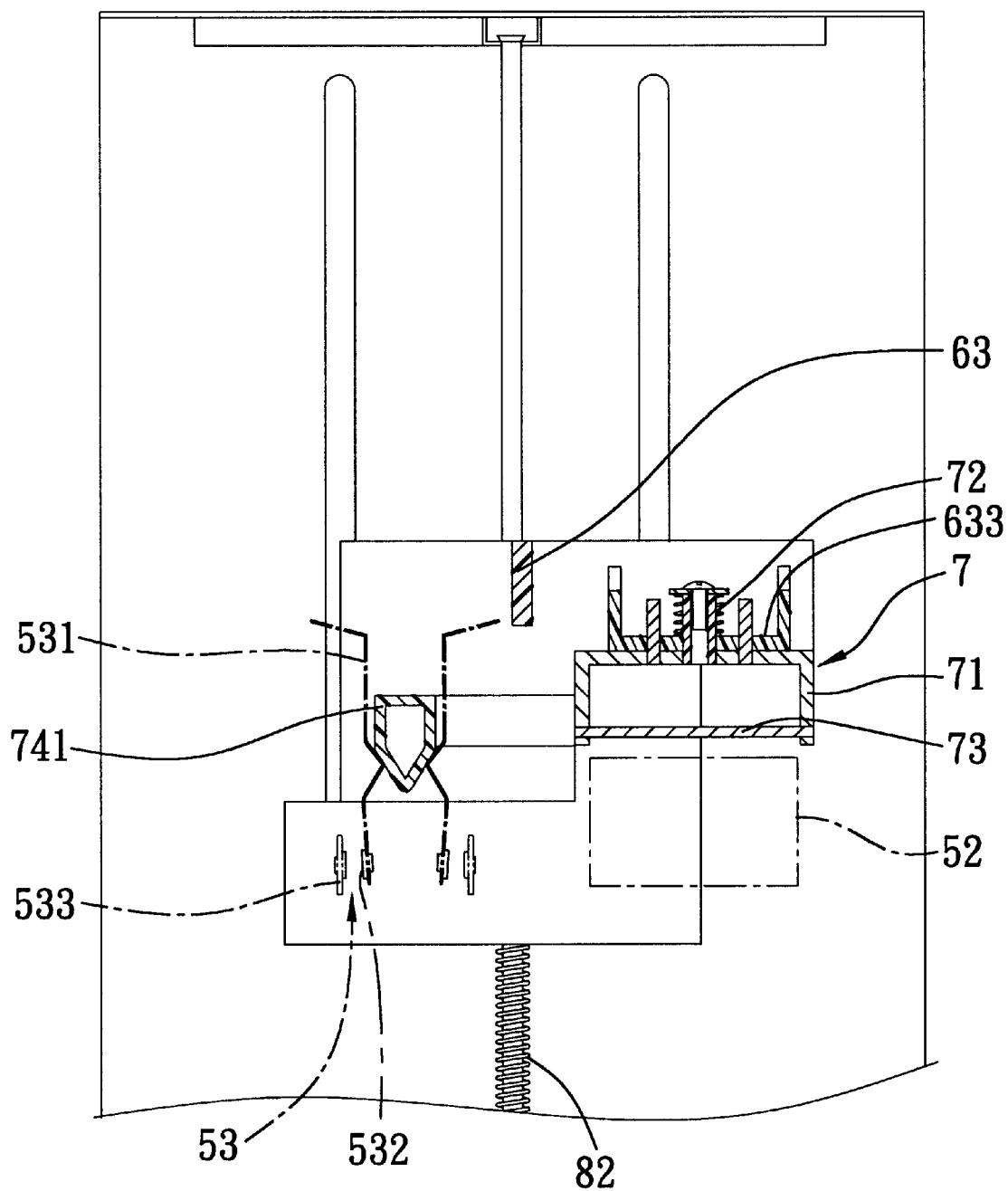
FIG. 7 is a fragmentary partly sectional schematic view of the preferred embodiment to illustrate how a support seat is moved from a lower retaining position to an upper releasing position for switching the power switch unit to an OFF-mode when jamming of the carriage at the toasting position occurs.

It is noted that the control unit 5 ceases to energize the electromagnet 52 at the end of a toasting cycle so that, when jamming of the carriage 6 at the toasting position occurs, the support seat 71 is moved to the upper releasing position by the biasing action of the biasing member 72, thereby resulting in corresponding movement of the switch actuator 74 to switch the power switch unit 53 from the ON-mode to the OFF-mode, as shown in FIG. 7.

The control unit 5 further includes a timing unit 54 connected electrically to the control circuit 50 and disposed on the housing 3. The timing unit 54 is operable so as to de-energize the electromagnet 52 at the end of the toasting cycle.

In view of the foregoing, the electric toaster of this invention operates in the following stages:

1. When the electric toaster is not in use, as shown FIGS. 1 and 4, the carriage 6 is disposed in the upper limit position, the electromagnet 52 is not energized, and the power switch unit 53 is in the OFF-mode. Accordingly, electric power to the electric heating unit 4 is cut-off.

2. When a food item loaded into the carriage 6 is to be toasted, the carriage 6 is moved from the upper limit position to the lower limit position due to application of the external force (F), indicated by an arrow in FIG. 5, such that the switch actuator 74 urges the resilient plates 531 to move away from each other so as to enable the second contacts 533 to contact the first contacts 532. As such, the power switch unit 53 is switched from the OFF-mode to the ON-mode such that the electromagnet 52 is energized so as to attract the magnetically-attracted plate 73, thereby holding the support seat 71 in the lower retaining position.

3. Subsequently, when the operating portion 63 is relieved from the external force (F), the carriage 6 moves from the lower limit position to the toasting position due to the biasing action of the biasing spring 82 of the biasing device 8 and the biasing member 72, as shown in FIG. 6, and the power switch, unit 53 is held in the ON-mode. The electromagnet 52 also holds the carriage 6 in the toasting position, and the electric heating unit 4 is kept activated by the control unit 5 so as to toast the food item in the carriage 6.

4. At the end of the toasting cycle that is under the control of the timing unit 54, the control unit 5 ceases to energize the electromagnet 52 such that the carriage 6 with the support seat 71 is biased to move from the toasting position to the upper limit position due to the biasing action of the biasing spring 82. However, if the carriage 6 is jammed in the toasting position for some reason, the support seat 71 is moved from the lower retaining position to the upper releasing position by the biasing action of the biasing member 72 such that the power switch unit 55 can be switched normally to the OFF-mode, as best shown in FIG. 7. Therefore, safety can be ensured.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electric toaster comprising:
   a housing including a toasting compartment;
   an electric heating unit disposed in said toasting compartment;
   a carriage mounted in said toasting compartment and movable vertically among a lower limit position, an upper limit position, and a toasting position between the lower limit and upper limit positions and located closer to the lower limit position as compared to the upper limit position, whereby a food item to be toasted is adapted to be loaded in and unloaded from said carriage when said carriage is in the upper limit position, and whereby the food item is adapted to be toasted when said carriage is in the toasting position;
   a biasing device disposed in said housing for biasing said carriage to the upper limit position;
   a magnetically-attracted retaining mechanism including
      a support seat movably supported by said carriage so as to be movable together with said carriage among the upper limit position, the lower limit position and the toasting position, said support seat being further movable relative to said carriage between an upper releasing position and a lower retaining position,
      a biasing member provided on said support seat for biasing said support seat to the upper releasing position,
      a magnetically-attracted plate mounted on said support seat, and
      a switch actuator provided on said support seat;
   a control unit connected electrically to said electric heating unit, said control unit including a power switch unit disposed in said housing and switched by said switch actuator from an OFF-mode, where electric power to said electric heating unit is cut-off, to an ON-mode, where electric power is supplied to said electric heating unit, when said carriage is moved from the upper limit position to the lower limit position upon application of an external force against biasing action of said biasing device; and
   an electromagnet disposed in said housing adjacent to said carriage and connected electrically to said control unit said electromagnet being energized by said control unit when said power switch unit is switched from the OFF-mode to the ON-mode to attract said magnetically-attracted plate so that, once the external force applied for moving said carriage to the lower limit position is relieved, said biasing device biases said carriage to move from the lower limit position to the toasting position, thereby holding said support seat in the lower retaining position against biasing action of said biasing member and thereby holding said carriage in the toasting position.

2. The electric toaster as claimed in claim 1, wherein said control unit ceases to energize said electromagnet at the end of a toasting cycle so that, when jamming of said carriage at the toasting position occurs, said support seat is moved to the upper releasing position by the biasing action of said biasing member, thereby resulting in corresponding movement of said switch actuator to switch said power switch unit from the ON-mode to the OFF-mode.

3. The electric toaster as claimed in claim 2, wherein said control unit further includes a timing unit disposed on said housing and operable so as to de-energize said electromagnet at the end of the toasting cycle.

4. The electric toaster as claimed in claim 1, wherein said carriage is formed with a mounting plate, said mounting plate being formed with a post hole therethrough, said support seat being formed with a sleeve post that extends slidably through said post hole, said sleeve post having a distal top end with a stop ring mounted thereon, said biasing member including a coil spring sleeved on said sleeve post and having opposite ends that abut against said stop ring and said mounting plate, respectively.

5. The electric toaster as claimed in claim 4, wherein said mounting plate is further formed with a guide hole therethrough, said support seat further having a guide post that extends slidably through said guide hole.

6. The electric toaster as claimed in claim 1, wherein said power switch unit includes:
   a circuit board;
   a stationary contact member mounted fixedly on said circuit board; and
   a resilient contact member mounted on said circuit board, said resilient contact member having a resilient contact part normally spaced apart from said stationary contact member to dispose said power switch unit in the OFF-mode and urged by said switch actuator so as to contact electrically said stationary contact member to switch said power switch unit to the ON-mode.

7. The electric toaster as claimed in claim 6, wherein said stationary contact member includes a pair of first contacts spaced apart from each other, said resilient contact member including a pair of resilient plates disposed between said first contacts, each of said resilient plates having an anchoring end portion secured to said circuit board, a distal end portion provided with a second contact for contacting an adjacent one of said first contacts, and a curved intermediate portion between said anchoring and distal end portions and curving toward the other of said resilient plates, said curved intermediate and distal end portions of said resilient plates serving as said resilient contact part of said resilient contact member.

8. The electric toaster as claimed in claim 7, wherein said switch actuator includes a wider spreader portion and a narrower guide portion having a width smaller than that of said spreader portion, said spreader portion abutting against said curved intermediate portions of said resilient plates to cause said resilient plates to move away from each other and cause said second contacts to contact said first contacts when said carriage is moved to the lower limit position, and when said carriage is in the toasting position and said support seat is held in the lower retaining position by said electromagnet, said guide portion abutting against said curved intermediate portions of said resilient plates to enable said resilient plates to move toward each other and cause said second contacts to break contact with said first contacts when.said support seat moves from the lower retaining position to the upper releasing position while said carriage is in the toasting position.

* * * * *